US012700677B2

(12) United States Patent
Johnston et al.

(10) Patent No.: US 12,700,677 B2
(45) Date of Patent: Aug. 4, 2026

(54) WIDEBAND DIRECTIONAL MONOPOLE ANTENNA

(71) Applicant: The Boeing Company, Arlington, VA (US)

(72) Inventors: Scott Robert Johnston, St. Louis, MO (US); Joseph Allen Norris, Jr., St. Louis, MO (US)

(73) Assignee: The Boeing Company, Arlington, VA (US)

( * ) Notice: Subject to any disclaimer, the term of this patent is extended or adjusted under 35 U.S.C. 154(b) by 171 days.

(21) Appl. No.: 18/811,295

(22) Filed: Aug. 21, 2024

(65) Prior Publication Data

US 2026/0058372 A1 Feb. 26, 2026

(51) Int. Cl.
*H01Q 9/30* (2006.01)
*H01Q 1/38* (2006.01)

(52) U.S. Cl.
CPC ................. *H01Q 9/30* (2013.01); *H01Q 1/38* (2013.01)

(58) Field of Classification Search
CPC ................................... H01Q 9/30; H01Q 1/38
See application file for complete search history.

(56) References Cited

U.S. PATENT DOCUMENTS 5,793,337 A * 8/1998 Schenkyr ................. H01Q 9/40 343/846
8,504,135 B2 * 8/2013 Bourqui ............... H01Q 13/085 600/407
8,773,312 B1 * 7/2014 Diaz ........................ H01Q 1/38 343/700 MS
10,320,053 B2 * 6/2019 Song .................. H01Q 21/0037
10,608,310 B1 * 3/2020 Morton .................... H01P 3/003
12,009,600 B1 * 6/2024 Jensen ................... H01Q 21/26
12,431,628 B2 * 9/2025 Eubanks .................. H01Q 1/38
2003/0156065 A1 * 8/2003 Jo ............................ H01Q 9/27 343/895
2003/0210207 A1 * 11/2003 Suh ......................... H01Q 1/38 343/895
2004/0150579 A1 * 8/2004 Dotto ................... H01Q 13/085 343/795
2005/0030232 A1 * 2/2005 Monebhurrun .......... H01Q 9/16 343/702
2005/0116873 A1 * 6/2005 Soler Castany ......... H01Q 5/42 343/700 MS
2006/0055616 A1 * 3/2006 Heyde ...................... H01Q 9/43 343/828
2007/0194990 A1 * 8/2007 Ling ........................ H01Q 9/40 343/700 MS
2009/0115673 A1 * 5/2009 Nysen ...................... H04B 7/04 343/730
2010/0121319 A1 * 5/2010 Chu ................... A61B 18/1815 606/33

(Continued)

*Primary Examiner* — Dameon E Levi
*Assistant Examiner* — Jordan E. DeWitt
(74) *Attorney, Agent, or Firm* — Yee & Associates, P.C.

(57) ABSTRACT

A monopole wideband antenna is provided. The monopole wideband antenna comprise a quartic monopole feed element connected to a center feed of a coaxial connector. A Vivaldi ground plane element is connected to a shield end of the coaxial connector, wherein the Vivaldi ground plane element comprises two vanes, each on opposite sides of the shield end of the coaxial connector. The quartic monopole feed element and Vivaldi ground plane element are in a common plane.

20 Claims, 9 Drawing Sheets

(56) References Cited

U.S. PATENT DOCUMENTS

| | | | | |
|---|---|---|---|---|
| 2010/0141530 | A1* | 6/2010 | McMahon | H01Q 5/378 342/417 |
| 2010/0231462 | A1* | 9/2010 | Tran | H01Q 1/38 343/893 |
| 2011/0148722 | A1* | 6/2011 | Bellows | H01Q 21/29 343/729 |
| 2011/0298679 | A1* | 12/2011 | Elliot | H01Q 9/40 343/727 |
| 2012/0068898 | A1* | 3/2012 | Clow | H01Q 9/36 343/893 |
| 2012/0068902 | A1* | 3/2012 | Clow | H01Q 15/008 343/791 |
| 2013/0214982 | A1* | 8/2013 | Dean | H01Q 9/285 343/795 |
| 2013/0222188 | A1* | 8/2013 | Ridgeway | H01Q 9/285 343/700 MS |
| 2013/0321212 | A1* | 12/2013 | O'Shea | H01Q 1/38 343/700 MS |
| 2014/0306854 | A1* | 10/2014 | Flores-Cuadras | H01Q 5/307 343/722 |
| 2014/0347243 | A1* | 11/2014 | Abadi | H01Q 5/364 343/860 |
| 2016/0322702 | A1* | 11/2016 | Sayama | H01Q 21/28 |
| 2017/0222321 | A1* | 8/2017 | Caratelli | H01Q 9/0485 |
| 2018/0366803 | A1* | 12/2018 | Morton | H01P 1/215 |
| 2019/0380776 | A1* | 12/2019 | Chu | A61B 18/1815 |
| 2020/0266545 | A1* | 8/2020 | Klein | H01Q 1/38 |
| 2021/0066809 | A1* | 3/2021 | Flores-Cuadras | H01Q 1/38 |
| 2022/0393368 | A1* | 12/2022 | Li | H01Q 9/285 |
| 2025/0023247 | A1* | 1/2025 | Zaghloul | H01Q 13/085 |
| 2026/0024915 | A1* | 1/2026 | McCormick | H01Q 5/48 |
| 2026/0058372 | A1* | 2/2026 | Johnston | H01Q 9/30 |

* cited by examiner

WIDEBAND DIRECTIONAL MONOPOLE ANTENNA

BACKGROUND INFORMATION

Technical Field

The present disclosure relates generally to antennas, and more specifically to wideband antenna with directional gain.

Background

A monopole antenna is a type of radio antenna comprising a single conducting rod, often mounted perpendicularly over some form of conductive surface called a ground plane. Monopole antennas are widely used in various applications due to their simple design, ease of construction, and omnidirectional radiation pattern.

Almost all monopole omnidirectional antennas are narrowband. For frequencies in the VHF/UHF range, monopole antennas are physically large. However, platforms such as unmanned aerial vehicles (UAVs) require low cost and compact antennas solutions.

Therefore, it would be desirable to have a method and apparatus that take into account at least some of the issues discussed above, as well as other possible issues.

SUMMARY

An illustrative embodiment provides a monopole wideband antenna. The monopole wideband antenna comprise a quartic monopole feed element connected to a center feed of a coaxial connector. A Vivaldi ground plane element is connected to a shield end of the coaxial connector, wherein the Vivaldi ground plane element comprises two vanes, each on opposite sides of the shield end of the coaxial connector. The quartic monopole feed element and Vivaldi ground plane element are in a common plane.

Another illustrative embodiment provides a monopole wideband antenna. The monopole wideband antenna comprises a quartic monopole feed element connected to a first end of a coaxial connector. A Vivaldi ground plane element is also connected to the first end of the coaxial connector. The Vivaldi ground plane element is coplanar with the quartic monopole feed element.

Another illustrative embodiment provides a monopole wideband antenna assembly. The monopole wideband antenna assembly comprises a fin structure configured for mounting on a vehicle. A quartic monopole feed element is enclosed within the fin structure. A Vivaldi ground plane element is also enclosed within the fin structure coplanar with the quartic monopole feed element. The quartic monopole feed element and Vivaldi ground plane element are connected to a first end of a coaxial connector.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that linear polarized antennas comprise either monopole or Vivaldi designs.

The illustrative embodiments also recognize and take into account that almost all monopole omnidirectional antennas are narrowband. For frequencies in the VHF/UHF range, monopole antennas are physically large.

The illustrative embodiments also recognize and take into account that platforms such as unmanned aerial vehicles (UAVs) require low cost and compact antennas solutions. The antenna needs to be integrated into the UAV at minimized cost.

The illustrative embodiments provide an antenna that combines a monopole structure defined by a parametric quartic shape with a Vivaldi ground plane. The quartic shape allows for lower frequencies in a more compact geometry. The Vivaldi component creates directional gain via the throat between the quartic monopole and ground plane. This combination provides a compact wideband antenna that is close to omnidirectional with high gain directionality designed into its geometry.

The parameters of the quartic monopole can be modified such that wide bandwidth and gain can be maintained, even when the dielectric structure has been changed. The antenna supports bands from UHF to Ka and is suitable for applications such as, e.g., GPS, telemetry, datalink, and flight termination.

The antenna design of the illustrative embodiments can replace multiple antennas (multiple bands) at a low cost of fabrication. The fabrication methods include those for inclusion within small platforms such as UAVs. Integrating the antenna into the aerostructure of a UAV or similar platform reduces costs to meet cost goals as well as reducing volume to meet payload requirements.

Figure 1:
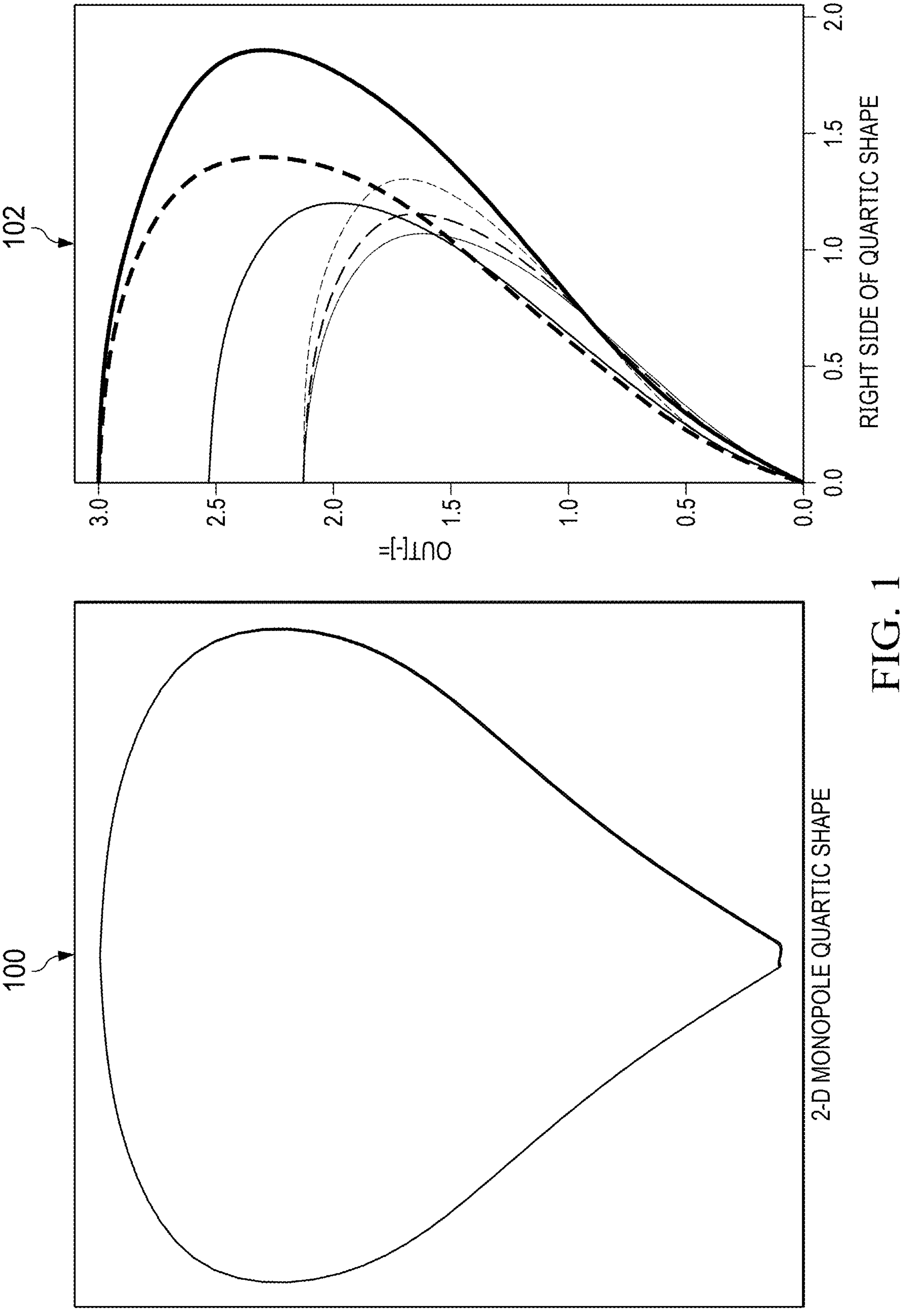
FIG. 1 illustrates a quartic monopole feed element in accordance with an illustrative embodiment.

FIG. 1 illustrates a quartic monopole feed element in accordance with an illustrative embodiment. The two-dimensional (2D) shape of quartic monopole feed element 100 is defined parametrically: x(t), y(t). Four parameters define the shape of quartic monopole feed element 100: aa, bb, mm, nn.

The shape of the quartic monopole feed element 100 is defined as:

$$x[t\_] := \sqrt{\frac{t^{mm}(aa-t)}{bb^{nn}}}$$

$$y[t\_] := t$$

where t is a parameter that ranges from 0 to aa.

Graph 102 depicts several plots defining the right side of the quartic shape according to different parametric values. The quartic shape depends upon the materials on which the monopole wideband antenna is to be mounted (see FIG. 3). By changing the parameters (and hence the quartic shape) for different materials, the performance of the antenna can be maintained across the same bandwidth.

Figure 2:
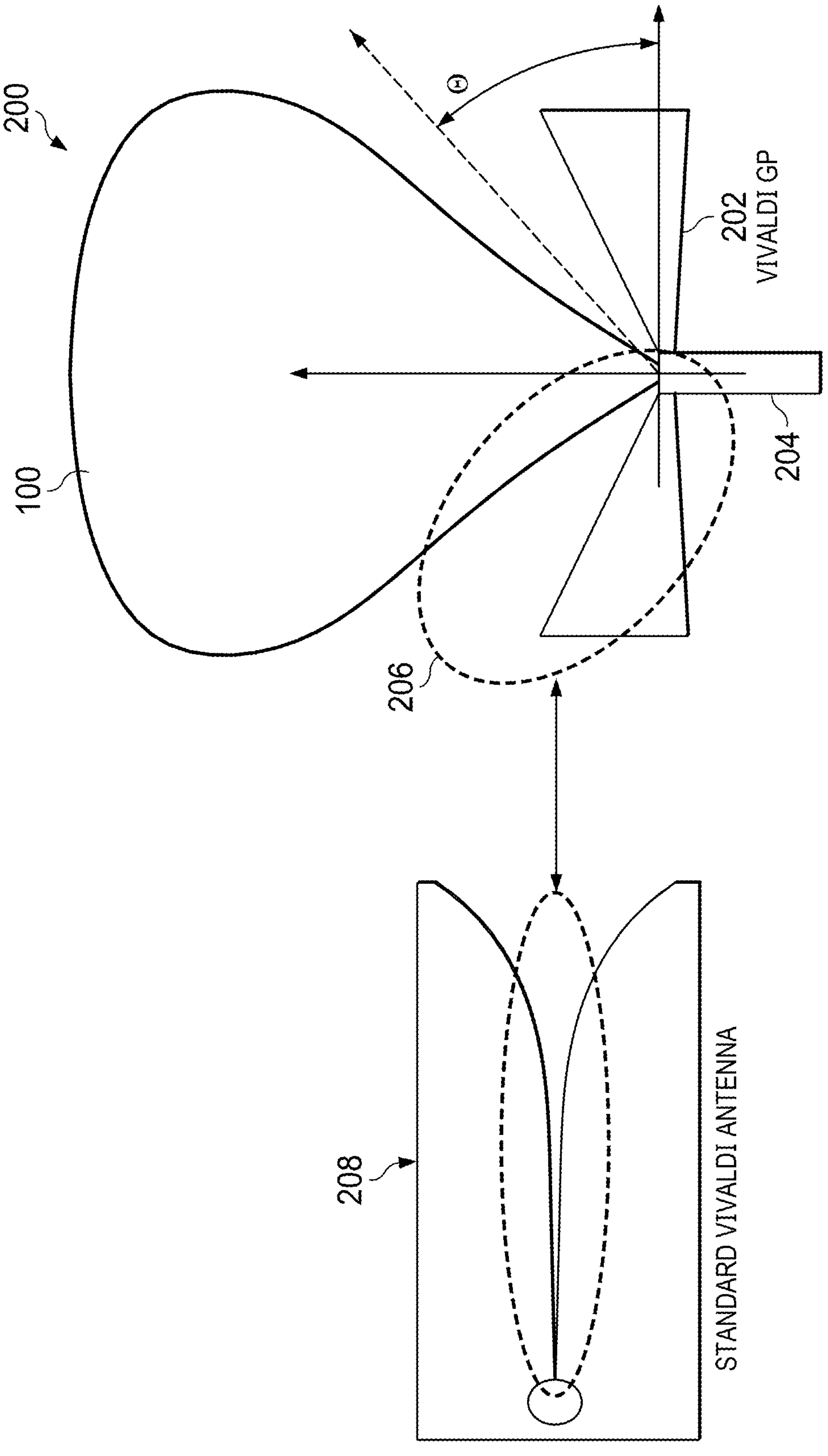
FIG. 2 depicts a monopole wideband antenna in accordance with an illustrative embodiment.

FIG. 2 depicts a monopole wideband antenna in accordance with an illustrative embodiment. Monopole wideband antenna 200 comprises quartic monopole feed element 100 combined with Vivaldi ground plane 202.

Quartic monopole feed element 100 is connected to a center feed of a coaxial connector 204. Vivaldi ground plane element 202 is connected to an axial shield at the shield end of the coaxial connector 204. As shown, Vivaldi ground plane element 202 comprises two vanes, each on opposite sides of the shield end of the coaxial connector 204. The quartic monopole feed element 100 and Vivaldi ground plane element 202 are in a common plane.

Throat 206 is defined between quartic monopole feed element 100 and Vivaldi ground plane element 202 and emulates the functionality of a standard Vivaldi antenna 208 to increase bandwidth. The direction of energy emitted from monopole wideband antenna 200 is determined by the throat angle Θ between the quartic monopole feed element 100 and the vanes of the Vivaldi ground plane element 202, thereby directing the primary gain pattern (see FIGS. 4-7). Therefore, given the same quartic shape, the energy can be directed in different directions merely by changing Θ.

The throat angle Θ may be the same for both vanes of Vivaldi ground plane 202 or the two vanes may have different throat angles depending on the desired gain pattern (e.g., more forward or aft of a UAV).

Quartic parameters combined with the Vivaldi design allow for ultrawide bandwidths with high gain results.

Figure 3:
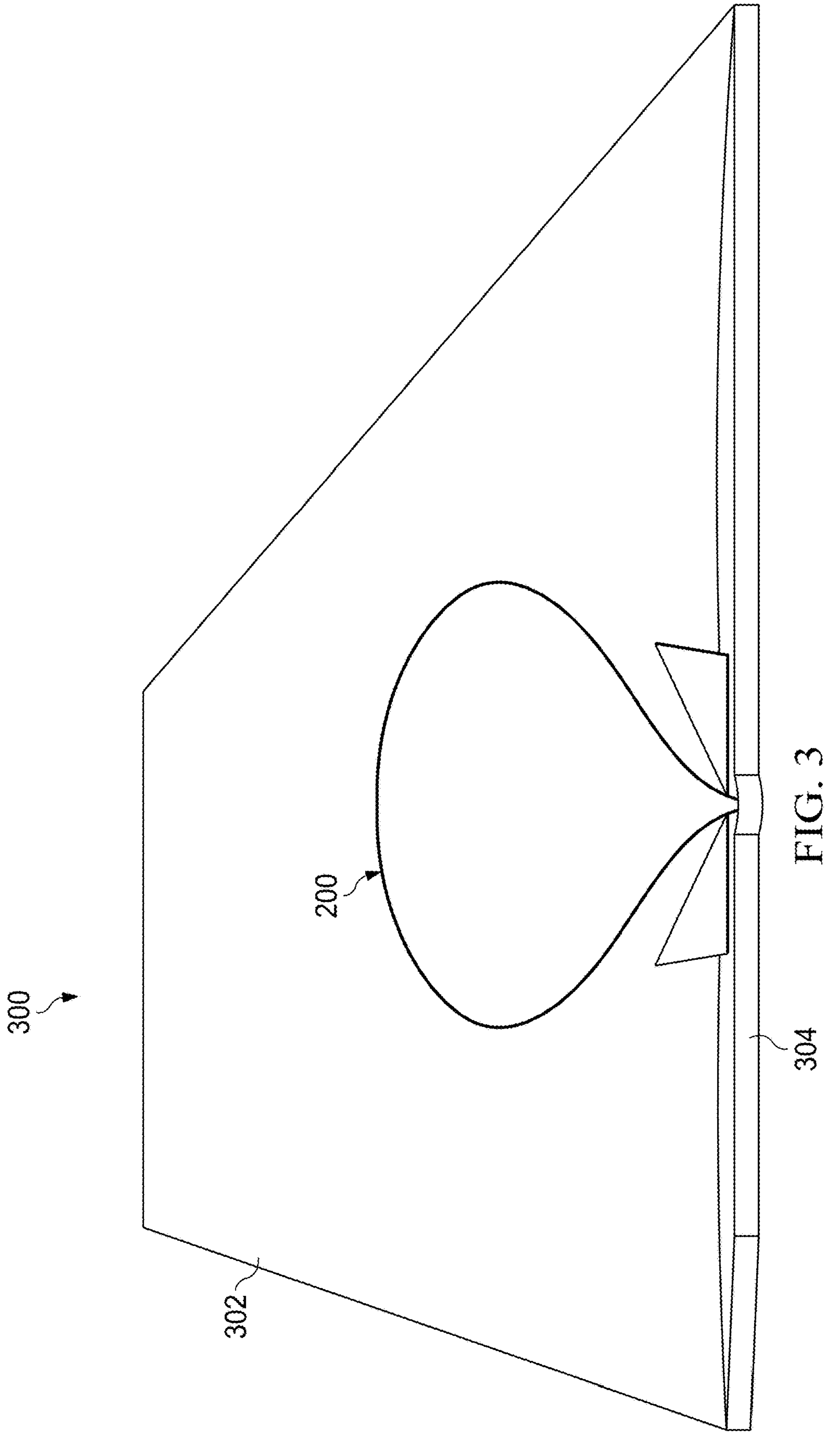
FIG. 3 depicts a monopole wideband antenna embedded in a fin structure in accordance with an illustrative embodiment.

FIG. 3 depicts a monopole wideband antenna embedded in a fin structure in accordance with an illustrative embodiment. Fin structure 300 can be adapted to mount on a UAV or other suitable platform.

Fin structure 300 comprises a dielectric core 302 in which the monopole wideband antenna 200 is embedded. Core 302 provides that actual fin shape. Core 302 may be made of any non-metallic loaded resin such as, e.g., polyimide resin. Monopole wideband antenna 200 itself may be made from a suitable conductor such as copper.

The coaxial connector (not visible in this view) is connected to root 304 of fin structure 300. Root 304 may be made of titanium or other suitable metal and forms the base that anchors fin structure 300 to the platform on which it is mounted.

In addition to a fin structure, the monopole wideband antenna can be mounted in a wing structure, or any suitable protrusion of a host platform.

FIGS. 4-7 depicts simulation results for a monopole wideband antenna embedded in a fin structure as shown in FIG. 3. The graphs in FIGS. 4-7 depict direction in degrees versus dBi of radiation.

Figure 4:
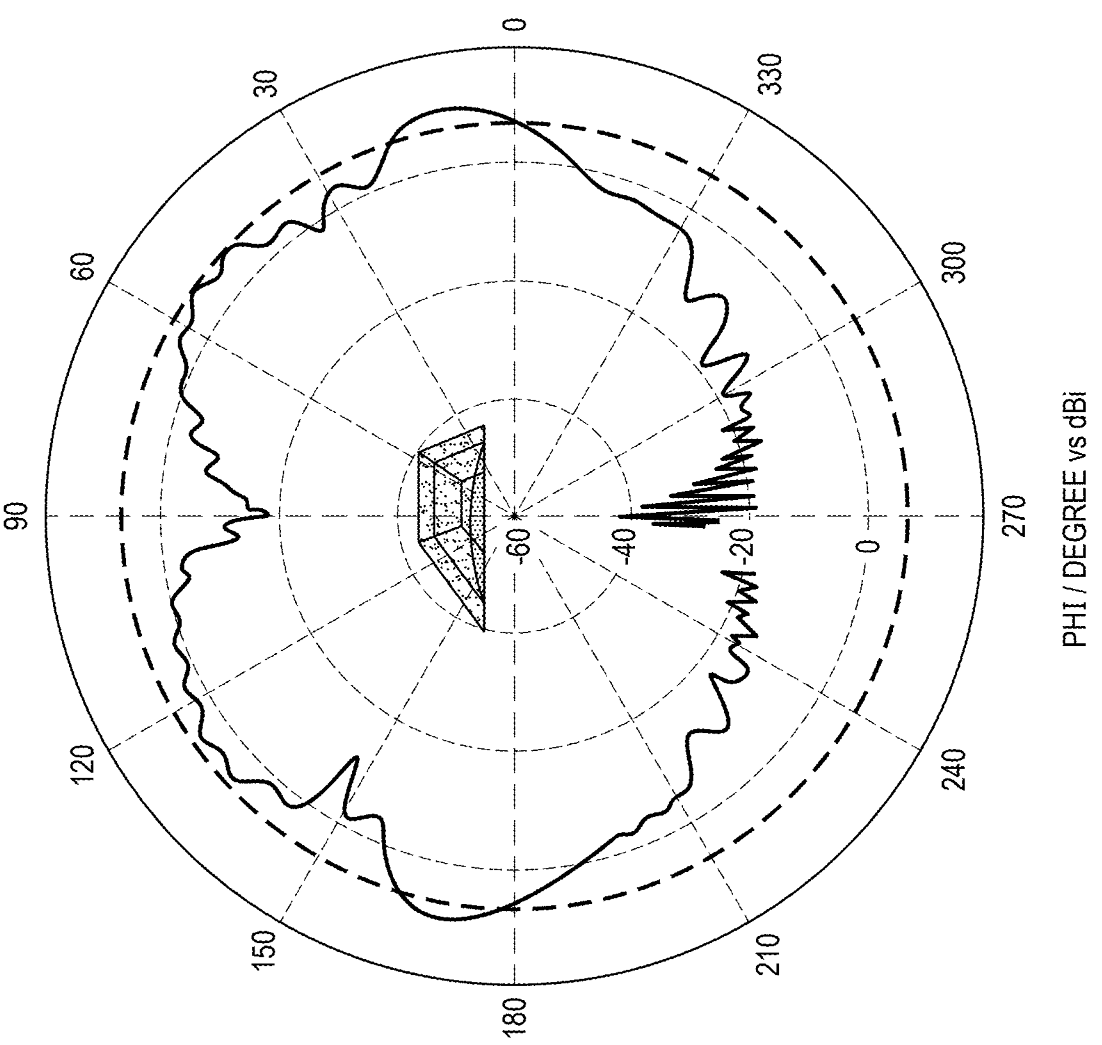
FIG. 4 depicts graph illustrating farfield realized gain for a monopole wideband antenna at 3.0 GHZ in accordance with an illustrative embodiment.

FIG. 4 depicts graph illustrating farfield realized gain for a monopole wideband antenna at 3.0 GHz in accordance with an illustrative embodiment.

In this example, the frequency is 3 GHZ, the main lobe magnitude is 9.43 dBi, main lobe direction is 12.0 degrees, angular width (3 dB) is 16.5 degrees, and side lobe level is −3.2 dB.

Figure 5:
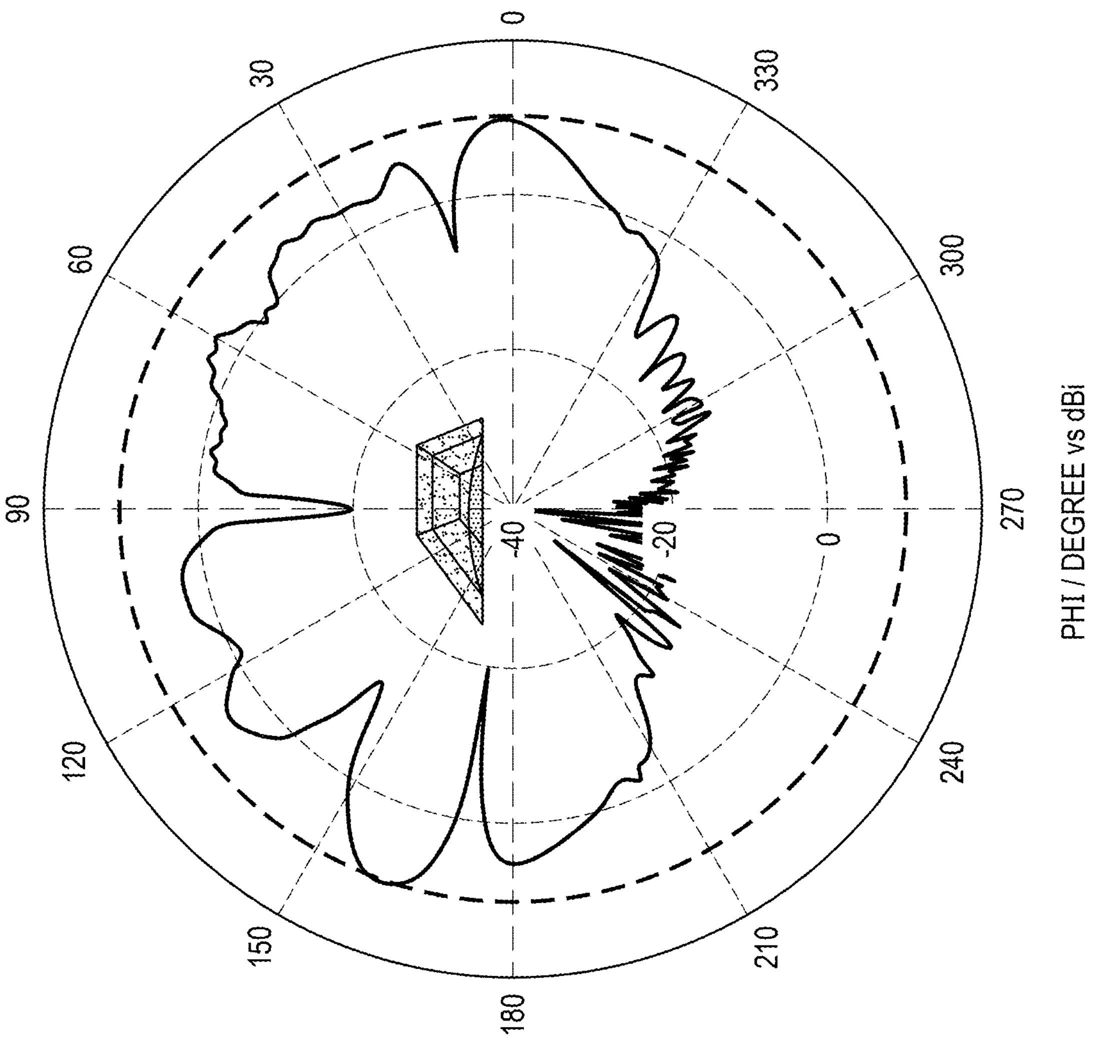
FIG. 5 depicts graph illustrating farfield realized gain for a monopole wideband antenna at 5.0 GHZ in accordance with an illustrative embodiment.

FIG. 5 depicts graph illustrating farfield realized gain for a monopole wideband antenna at 5.0 GHz in accordance with an illustrative embodiment.

In this example, the frequency is 5 GHZ, the main lobe magnitude is 10.8 dBi, main lobe direction is 161.0 degrees, angular width (3 dB) is 11.9 degrees, and side lobe level is −1.0 dB.

Figure 6:
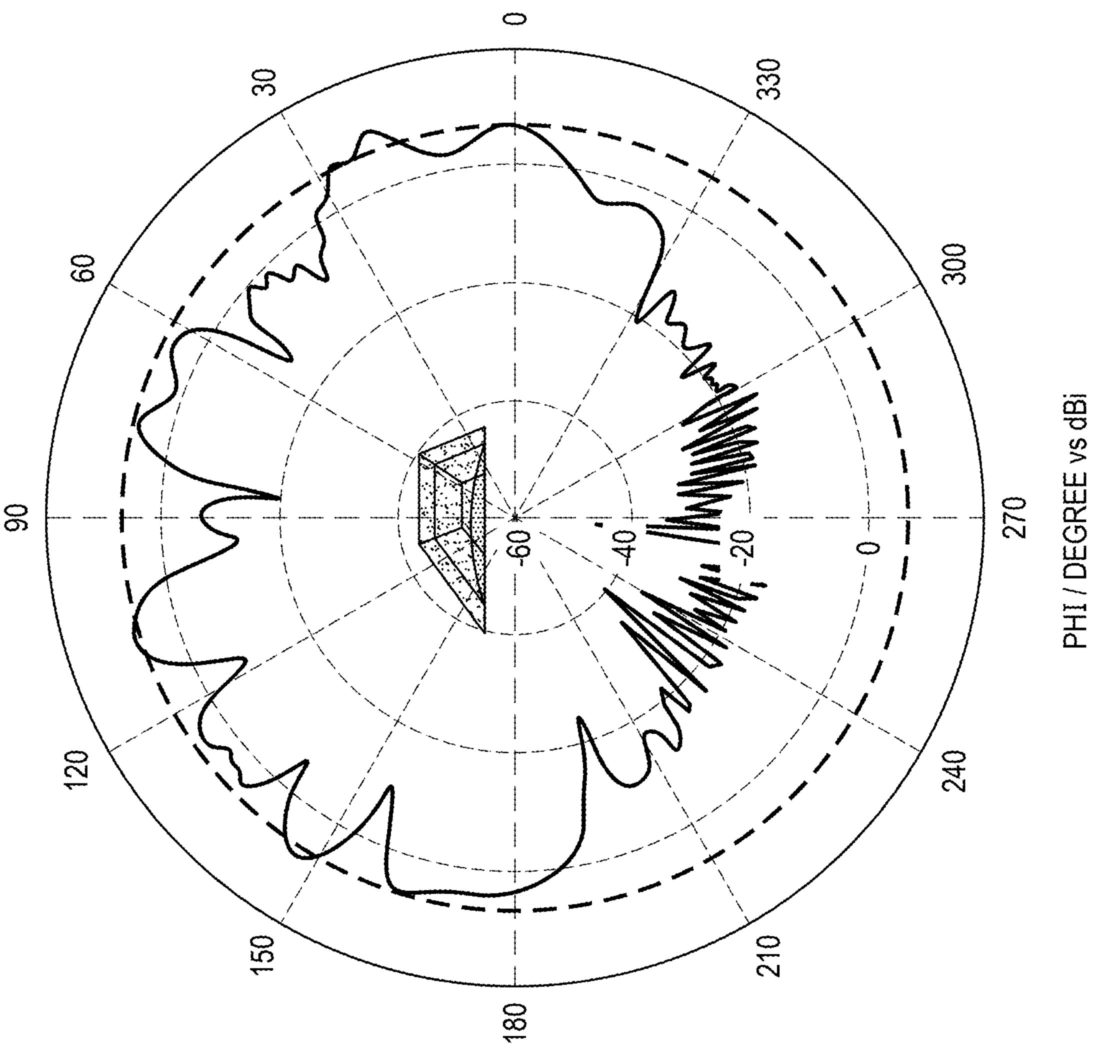
FIG. 6 depicts graph illustrating farfield realized gain for a monopole wideband antenna at 7.0 GHZ in accordance with an illustrative embodiment.

FIG. 6 depicts graph illustrating farfield realized gain for a monopole wideband antenna at 7.0 GHz in accordance with an illustrative embodiment.

In this example, the frequency is 7 GHz, the main lobe magnitude is 10.3 dBi, main lobe direction is 22.0 degrees, angular width (3 dB) is 7.5 degrees, and side lobe level is −1.1 dB.

Figure 7:
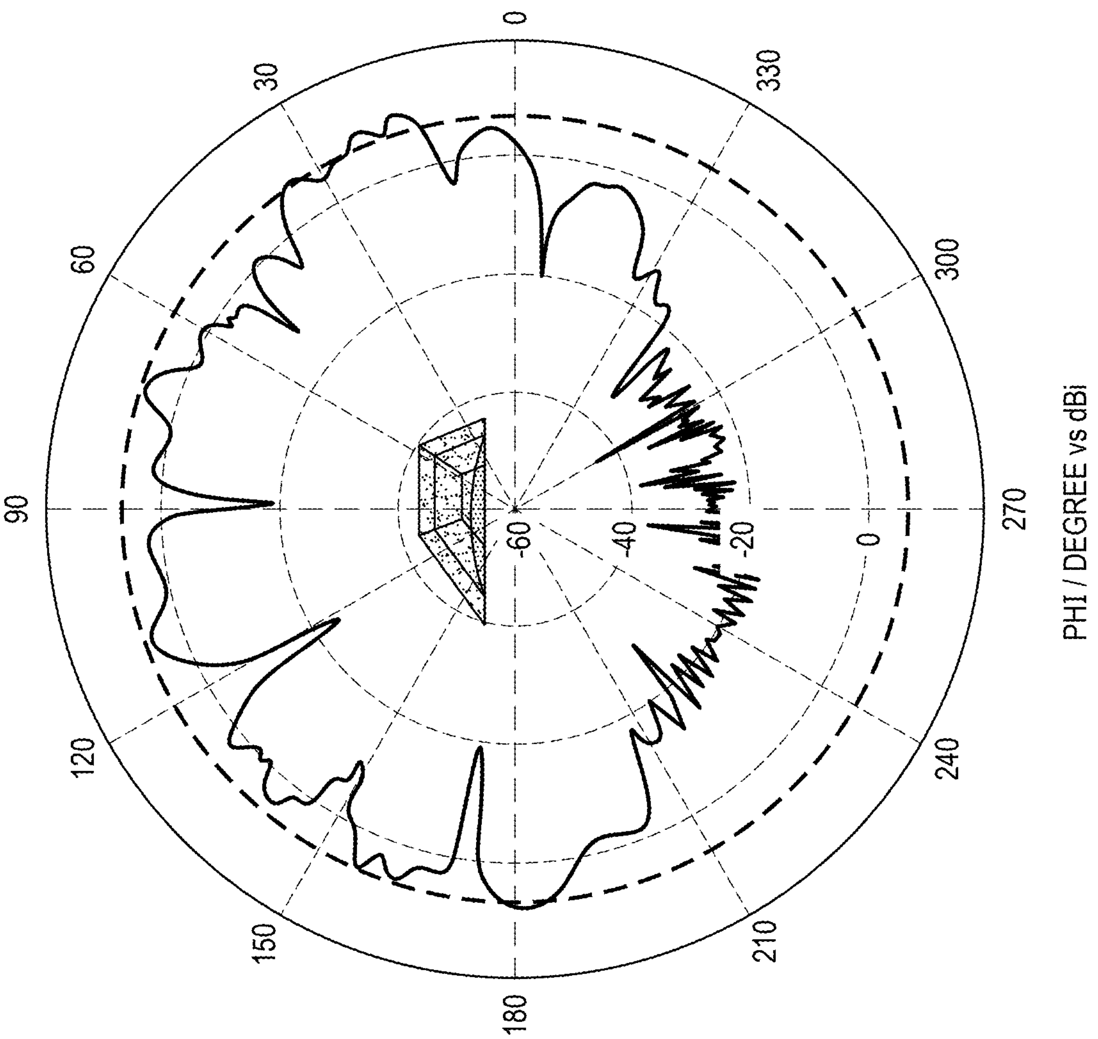
FIG. 7 depicts graph illustrating farfield realized gain for a monopole wideband antenna at 9.0 GHZ in accordance with an illustrative embodiment.

FIG. 7 depicts graph illustrating farfield realized gain for a monopole wideband antenna at 9.0 GHz in accordance with an illustrative embodiment.

In this example, the frequency is 9 GHz, the main lobe magnitude is 9.81 dBi, main lobe direction is 17.0 degrees, angular width (3 dB) is 11.8 degrees, and side lobe level is −1.6 dB.

Figure 8:
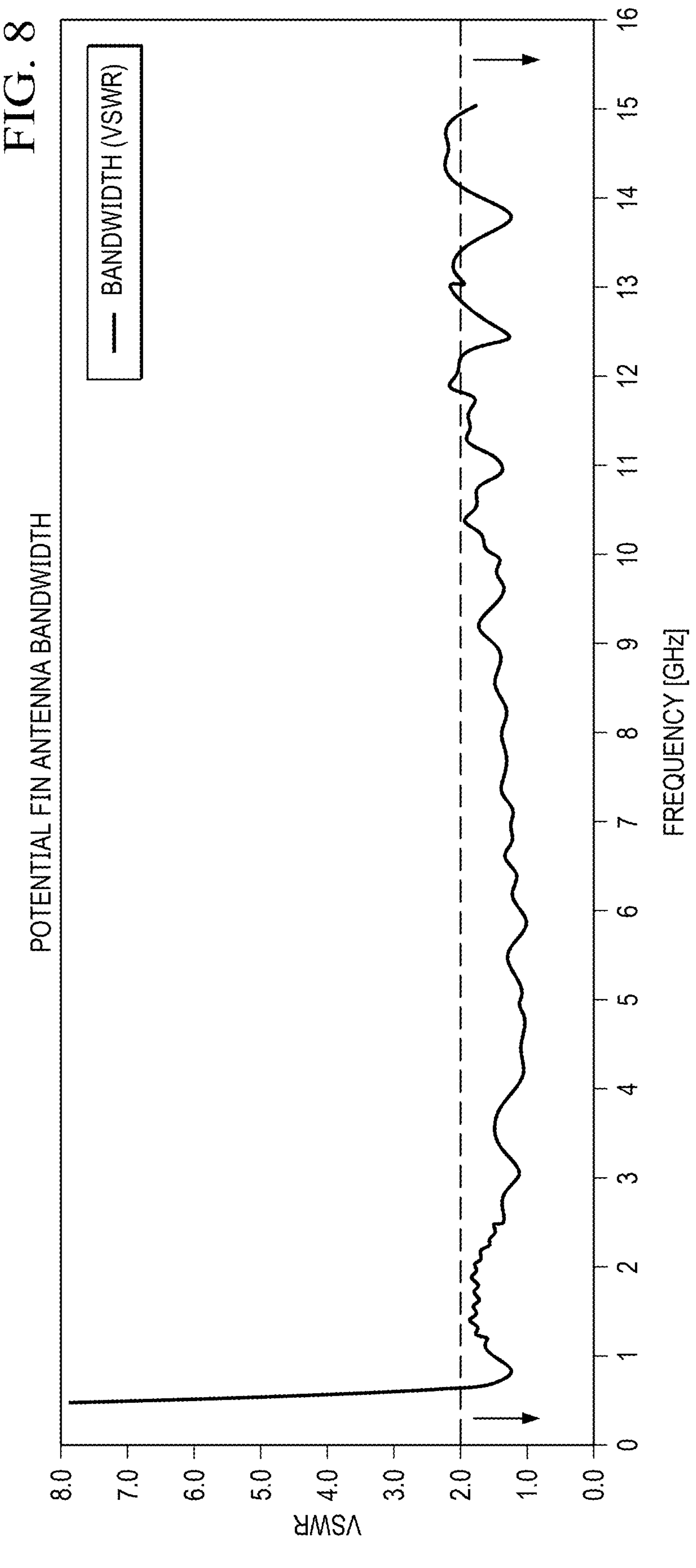
FIG. 8 depicts a graph illustrating potential bandwidth for a monopole wideband antenna within a polyimide fin structure in accordance with an illustrative embodiment.

FIG. 8 depicts a graph illustrating potential bandwidth for a monopole wideband antenna within a polyimide fin structure in accordance with an illustrative embodiment. FIG. 8 shows the voltage stating wave ratio (VSWR) across a wide frequency band.

VSWR measures how efficiently radio-frequency power is transmitted from a power source, through a transmission line, and into an antenna. A higher VSWR indicates more reflection and less efficient power transfer, which can lead to signal loss, heating, and potential damage to the transmitter. Therefore, the lower the number, the better. As illustrated In FIG. 8, the monopole wideband antenna of the illustrative embodiments functions well from just under 1 GHz through 15 GHZ.

Figure 9:
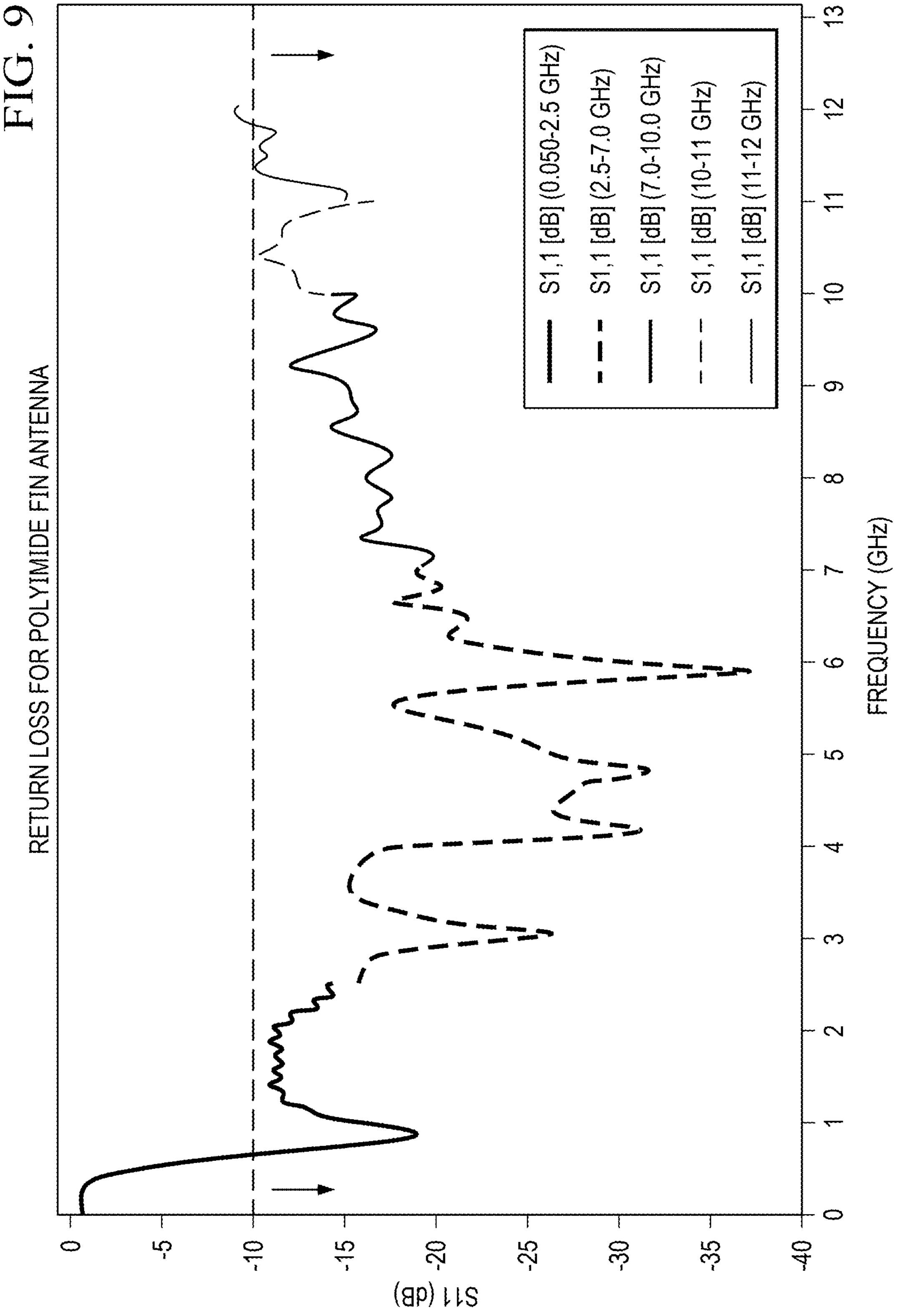
FIG. 9 depicts a graph illustrating return loss for a monopole wideband antenna within a polyimide fin structure in accordance with an illustrative embodiment.

FIG. 9 depicts a graph illustrating return loss for a monopole wideband antenna within a polyimide fin structure in accordance with an illustrative embodiment. Return loss represents the ratio of the power that is reflected back from the antenna to the power that is sent to it. A lower return loss indicates more power is being radiated by the antenna rather than being reflected back. As with VSWR, the smaller the number, the better the performance. A value below −10 dB indicates about 90% of the power is radiated.

As shown in FIG. 9, the monopole wideband antenna has a return loss under −10 dB between just under 1 GHz through almost 12 GHz.

As used herein, the phrase “at least one of,” when used with a list of items, means different combinations of one or more of the listed items can be used, and only one of each item in the list may be needed. In other words, “at least one of” means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A monopole wideband antenna, comprising:

a quartic monopole feed element connected to a center feed of a coaxial connector; and a Vivaldi ground plane element connected to a shield end of the coaxial connector, wherein the Vivaldi ground plane element comprises two vanes, each on opposite sides of the shield end of the coaxial connector, and wherein the quartic monopole feed element and Vivaldi ground plane element are in a common plane.

2. The monopole wideband antenna of claim 1, wherein the direction of energy emitted from the antenna is determined by a throat angle between the quartic monopole feed element and the vanes of the Vivaldi ground plane element.

3. The monopole wideband antenna of claim 2, wherein the two vanes have the same throat angle.

4. The monopole wideband antenna of claim 2, wherein the two vanes have different throat angles.

5. The monopole wideband antenna of claim 1, wherein the quartic monopole feed element has a shape defined parametrically according to a material on which the monopole wideband antenna is to be mounted.

6. The monopole wideband antenna of claim 1, wherein the antenna is enclosed within a structure configured for mounting on a vehicle.

7. The monopole wideband antenna of claim 6, wherein the structure comprises one of:

a protrusion;

a fin; or a wing.

8. The monopole wideband antenna of claim 6, wherein the structure is made of a non-metallic resin.

9. The monopole wideband antenna of claim 6, wherein the coaxial shield is connected to a titanium root.

10. A monopole wideband antenna, comprising:

a quartic monopole feed element connected to a first end of a coaxial connector; and a Vivaldi ground plane element connected to the first end of the coaxial connector, wherein the Vivaldi ground plane element is coplanar with the quartic monopole feed element.

11. The monopole wideband antenna of claim 10, wherein the direction of energy emitted from the antenna is determined by a throat angle between the quartic monopole feed element and the Vivaldi ground plane element.

12. The monopole wideband antenna of claim 11, wherein the Vivaldi ground plane element comprises a first vane on a first side of the coaxial connector and a second vane on a second side of the connector.

13. The monopole wideband antenna of claim 12, wherein the first vane and the second vane have different throat angles.

14. The monopole wideband antenna of claim 10, wherein the quartic monopole feed element has a shape defined parametrically according to a material on which the monopole wideband antenna is to be mounted.

15. The monopole wideband antenna of claim 10, wherein the antenna is enclosed within a structure configured for mounting on a vehicle.

16. The monopole wideband antenna of claim 15, wherein the structure is made of a non-metallic resin.

17. A monopole wideband antenna assembly, comprising:

a fin structure configured for mounting on a vehicle;

a quartic monopole feed element enclosed within the fin structure; and a Vivaldi ground plane element enclosed within the fin structure coplanar with the quartic monopole feed element, wherein the quartic monopole feed element and Vivaldi ground plane element are connected to a first end of a coaxial connector.

18. The monopole wideband antenna assembly of claim 17, wherein the coaxial shield is connected to a titanium root.

19. The monopole wideband antenna assembly of claim 17, wherein the fin structure is made of a non-metallic resin.

20. The monopole wideband antenna assembly of claim 17, wherein the direction of energy emitted from the antennas is determined by a throat angle between the quartic monopole feed element and the vanes of the Vivaldi ground plane element.

* * * * *